(12) United States Patent
Sugiyama (10) Patent No.: US 10,967,733 B2
(45) Date of Patent: Apr. 6, 2021

(54) FUEL SHUTOFF VALVE (71) Applicant: KYOSAN DENKI CO., LTD., Koga (JP)

(72) Inventor: Akinari Sugiyama, Koga (JP)

(73) Assignee: KYOSAN DENKI CO., LTD., Koga (JP)

( * ) Notice: Subject to any disclaimer, the term of this patent is extended or adjusted under 35 U.S.C. 154(b) by 0 days.

(21) Appl. No.: 16/268,524

(22) Filed: Feb. 6, 2019

(65) Prior Publication Data

US 2019/0168608 A1 Jun. 6, 2019

Related U.S. Application Data

(63) Continuation of application No. PCT/JP2017/022094, filed on Jun. 15, 2017.

(30) Foreign Application Priority Data

Aug. 9, 2016 (JP) .............................. JP2016-156594

(51) Int. Cl.
*B60K 15/035* (2006.01)
*F16K 31/28* (2006.01)
(Continued)

(52) U.S. Cl.
CPC ...... *B60K 15/03519* (2013.01); *B60K 15/035* (2013.01); *F16K 24/044* (2013.01);
(Continued)

(58) Field of Classification Search
CPC ............ B60K 15/03519; B60K 15/035; B60K 2015/03566; F16K 24/044; F16K 31/18; F16K 31/22; F16K 31/28; F02M 35/10222; F02M 37/023; Y10T 137/053; Y10T 137/0753; Y10T 137/0777; Y10T 137/0874; Y10T 137/3099; Y10T 137/6004; Y10T 137/7358; Y10T 137/7404; Y10T 137/7423;
(Continued)

(56) References Cited

U.S. PATENT DOCUMENTS 4,991,615 A * 2/1991 Szlaga ............. B60K 15/03519
137/202
5,028,244 A * 7/1991 Szlaga ............... B01D 19/0063
137/202
(Continued)

FOREIGN PATENT DOCUMENTS

| JP | H10131825 A | 5/1998 |
|----|-------------|--------|
| JP | 2013082427 A | 5/2013 |
| JP | 2014159209 A | 9/2014 |

*Primary Examiner* — Craig J Price
(74) *Attorney, Agent, or Firm* — Harness, Dickey & Pierce, P.L.C.

(57) ABSTRACT

A fuel shutoff valve includes a valve, a float, and an auxiliary member. The valve is configured to open or close an air passage of a fuel tank. The float floats on fuel and moves in a valve closing direction to close the valve, or in a valve opening direction opposite to the valve closing direction to open the valve. The auxiliary member has a predetermined weight, and abuts on the float to apply a weight on the float in the valve opening direction, or separating from the float not to apply the weight on the float in the valve closing direction.

10 Claims, 4 Drawing Sheets

(51) Int. Cl.
*F16K 31/22* (2006.01)
*F16K 24/04* (2006.01)
*F02M 35/10* (2006.01)
*F02M 37/00* (2006.01)

(52) U.S. Cl.
CPC .............. *F16K 31/22* (2013.01); *F16K 31/28* (2013.01); *B60K 2015/03566* (2013.01); *F02M 35/10222* (2013.01); *F02M 37/0023* (2013.01); *Y10T 137/0874* (2015.04); *Y10T 137/3099* (2015.04)

(58) Field of Classification Search
CPC ....... Y10T 137/7426; Y10T 137/86324; Y10T 137/86332
USPC ..... 137/15.26, 38, 39, 43, 202, 315.08, 409, 137/429, 430, 587, 588; 141/59, 198, 141/202, 229; 220/86.2, 745, 746; 123/516, 518, 198 D, 520
See application file for complete search history.

(56) References Cited

U.S. PATENT DOCUMENTS

| | | | | |
|---|---|---|---|---|
| 5,044,397 A * | 9/1991 | Szlaga | ............. | B60K 15/03519 137/202 |
| 5,156,178 A * | 10/1992 | Harris | ............. | B60K 15/03519 123/516 |
| 5,261,439 A * | 11/1993 | Harris | ............. | B60K 15/03519 123/516 |
| 5,873,382 A * | 2/1999 | Hattori | .................. | F16K 24/044 137/202 |
| 5,901,733 A * | 5/1999 | Ohno | ............... | B60K 15/03519 137/202 |
| 5,944,044 A * | 8/1999 | King | ............... | B60K 15/03519 137/202 |
| 6,634,341 B2 * | 10/2003 | Crary | ................... | B60K 15/035 123/516 |
| 7,448,364 B2 * | 11/2008 | Kaneko | .............. | F02M 25/0836 123/198 DB |
| 7,571,740 B2 * | 8/2009 | Kaneko | ................. | F16K 24/044 137/202 |
| 8,616,232 B2 * | 12/2013 | Suzuki | ............. | B60K 15/03519 137/202 |
| 9,096,122 B2 * | 8/2015 | Kaneko | ............ | B60K 15/03519 |
| 9,365,107 B2 * | 6/2016 | Gamble | ........... | B60K 15/03519 |
| 9,671,037 B2 * | 6/2017 | Kaneko | ................... | F16K 31/22 |
| 2004/0045602 A1 | 3/2004 | Palvolgyi et al. | | |
| 2007/0084510 A1 * | 4/2007 | Kaneko | ................. | F16K 24/044 137/202 |
| 2013/0075394 A1 | 3/2013 | Suzuki | | |
| 2013/0276912 A1 * | 10/2013 | Kaneko | ............ | B60K 15/03519 137/430 |
| 2014/0230920 A1 | 8/2014 | Shimokawa et al. | | |

\* cited by examiner

FUEL SHUTOFF VALVE

CROSS REFERENCE TO RELATED APPLICATIONS

The present application is a continuation application of International Patent Application No. PCT/JP2017/022094 filed on Jun. 15, 2017, which designated the United States and claims the benefit of priority from Japanese Patent Application No. 2016-156594 filed on Aug. 9, 2016. The entire disclosures of all of the above applications are incorporated herein by reference.

TECHNICAL FIELD

The present disclosure relates to a shutoff valve.

BACKGROUND

A fuel shutoff valve opens and closes an air passage of a fuel tank. The fuel shutoff valve is required to prevent leakage of fuel into the air passage.

SUMMARY

According to an aspect of the present disclosure, a fuel shutoff valve includes: a valve configured to open or close an air passage of a fuel tank; a float floating on fuel and moving in a valve closing direction to close the valve, or moving in a valve opening direction opposite to the valve closing direction to open the valve; and an auxiliary member having a predetermined weight, the auxiliary member abutting on the float to apply a weight on the float in the valve opening direction, or separating from the float not to apply the weight on the float in the valve closing direction.

DETAILED DESCRIPTION

To begin with, examples of relevant techniques will be described. A fuel shutoff valve opens and closes an air passage of a fuel tank. The fuel shutoff valve is required to prevent leakage of fuel into the air passage. The fuel shutoff valve functions as a liquid level sensing valve that floats on the liquid surface and closes the air passage when the liquid level in the fuel tank rises. The fuel shutoff valve has a function of a tilt sensing valve that closes the air passage by utilizing the weight of the valve body when the fuel tank is inclined by a predetermined angle or more.

The contents of the patent documents such as JP 2013-82427 A and JP 2014-159209 A are incorporated by reference as an explanation of technical elements in this specification.

In the configuration of the relevant techniques, the weight of the valve body and a member that operates the valve body may be increased in order to give the valve certain characteristics. However, the weight acting on the valve body affects the durability of the valve. For example, a heavy valve body may increase the friction between the valve body and the valve seat. When a material such as rubber is used for a contact portion, the self-weight of the valve body may wear the rubber, and the sealing property may be lowered. In another viewpoint, when the fuel tank is mounted on a moving body such as a vehicle, the vibration of the moving body causes vibration to the float that operates the valve, to cause friction between the valve body and the valve seat. Therefore, in case where the relevant techniques are used for a moving body, it is difficult to suppress the wear when the self-weight is increased. For example, the member may be made heavy in order to raise a pressure to reopen the valve. Further improvements are required for the fuel shutoff valve in the above-mentioned point of view, or in other aspects not mentioned, to provide a fuel shutoff valve with desirable characteristics and with high durability in the valve while maintaining the desirable characteristics of the valve.

According to the present disclosure, a fuel shutoff valve includes: a valve configured to open or close an air passage of a fuel tank; a float floating on fuel and moving in a valve closing direction to close the valve, or moving in a valve opening direction opposite to the valve closing direction to open the valve; and an auxiliary member having a predetermined weight, the auxiliary member abutting on the float to apply a weight on the float in the valve opening direction, or separating from the float not to apply the weight on the float in the valve closing direction.

Accordingly, the auxiliary member is in contact with or separated from the float depending on the movement in the valve opening direction or in the valve closing direction. Since the auxiliary member has a predetermined weight, the force acting from the float to the valve changes. Moreover, since the auxiliary member separates from the float in the valve closing direction, the auxiliary member does not apply undesirable weight in the valve closing direction. Therefore, it is possible to set the weight of the auxiliary member so as to set the desirable force in the valve opening direction.

Embodiments will be described with reference to the drawings. In some embodiments, parts that are functionally and/or structurally corresponding and/or associated are given the same reference numerals, or reference numerals with different hundred digit or more digits. For corresponding parts and/or associated parts, reference can be made to the description of other embodiments.

First Embodiment

Figure 1:
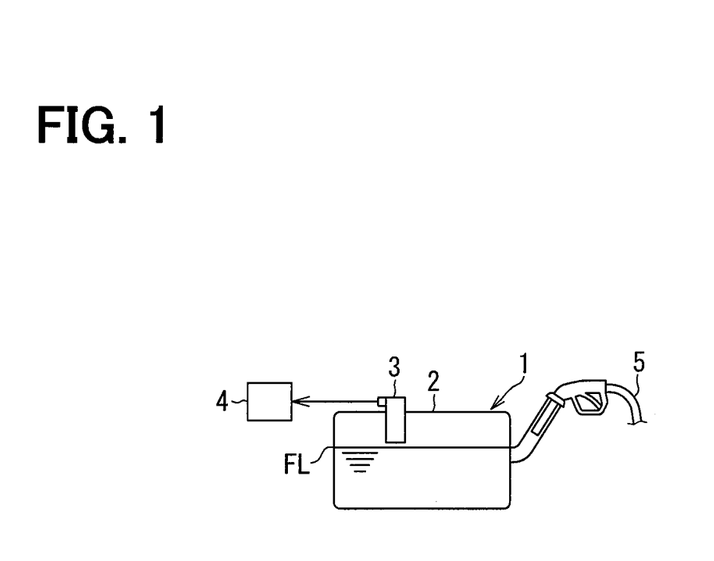
FIG. 1 is a block diagram illustrating a fuel storage device according to a first embodiment.

In FIG. 1, a fuel storage device 1 includes a fuel tank 2, a control valve 3, and a fuel vapor treatment device 4. The fuel storage device 1 is mounted on a vehicle. The vehicle is a car, a ship, or the like. The fuel storage device 1 supplies fuel to an internal combustion engine mounted on a vehicle. The internal combustion engine supplies power for movement. The fuel storage device 1 may include a fuel supply device such as a fuel pump, a fuel filter, a fuel injection device, or the like.

The fuel tank 2 is a tightly-sealed fuel tank which is refueled without being opened to the atmosphere. The control valve 3 is provided in the fuel tank 2. The control valve 3 is provided on the upper wall surface of the fuel tank 2. The control valve 3 may be located in a fuel supply device, such as pump module, that is provided in the fuel tank 2.

The control valve 3 is a fuel shutoff valve. The control valve 3 is provided in an air passage for ventilation between the fuel tank 2 and the fuel vapor treatment device 4. The air passage is used for discharging gas from the fuel tank 2 to the fuel vapor treatment device 4. The air passage is also called ventilation passage or breathing passage. The control valve 3 controls the air flow between the fuel tank 2 and the outside. The control valve 3 is also referred to as a fuel tank ventilation control valve. The control valve 3 opens and closes the air passage. The control valve 3 forms an air chamber in the fuel tank 2. The control valve 3 provides both a liquid level sense valve and a tilt sense valve for the fuel tank.

The control valve 3 allows air to flow between the fuel tank 2 and the fuel vapor treatment device 4 to refuel from the fuel supply port. The control valve 3 is also a tubular case for leaving an air chamber in the fuel tank 2. In another view, the control valve 3 hangs from a predetermined position of the fuel tank 2 in order to form an air chamber.

The control valve 3 shuts off the air flow between the fuel tank 2 and the fuel vapor treatment device 4, thereby urging a stop of the refueling from the fuel supply port. When the control valve 3 shuts off the air flow, the liquid level of the fuel rises toward the fuel supply port. As a result, an automatic stopping mechanism (also referred to as an auto stop mechanism) of the fueling device 5 reacts and the refueling from the fueling device 5 is automatically stopped. The control valve 3 is also called a fuel supply control valve or a full tank control valve for a fuel tank.

The fuel vapor treatment device 4 includes a canister for capturing fuel vapor contained in gas discharged from the fuel tank 2. The fuel vapor treatment device 4 includes a purge mechanism. When a predetermined condition is satisfied, the purge mechanism processes the fuel vapor by supplying the fuel vapor captured by the canister to the internal combustion engine for combustion.

Figure 2:
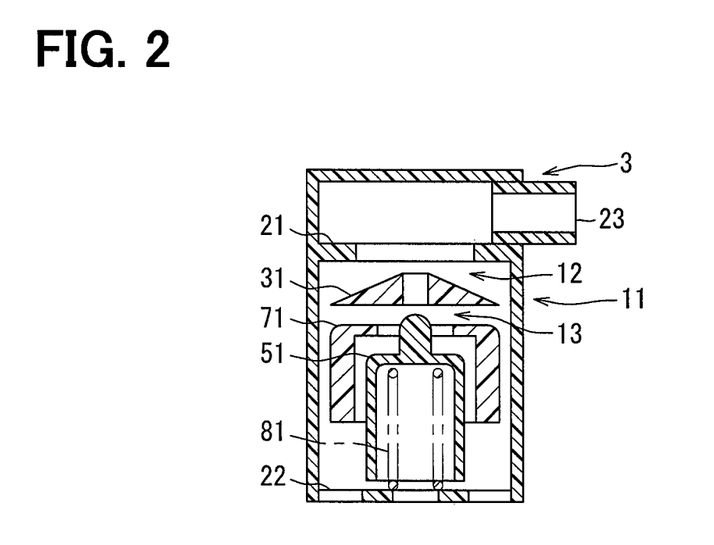
FIG. 2 is a vertical cross-sectional view illustrating a model of a fuel shutoff valve.
Figure 3:
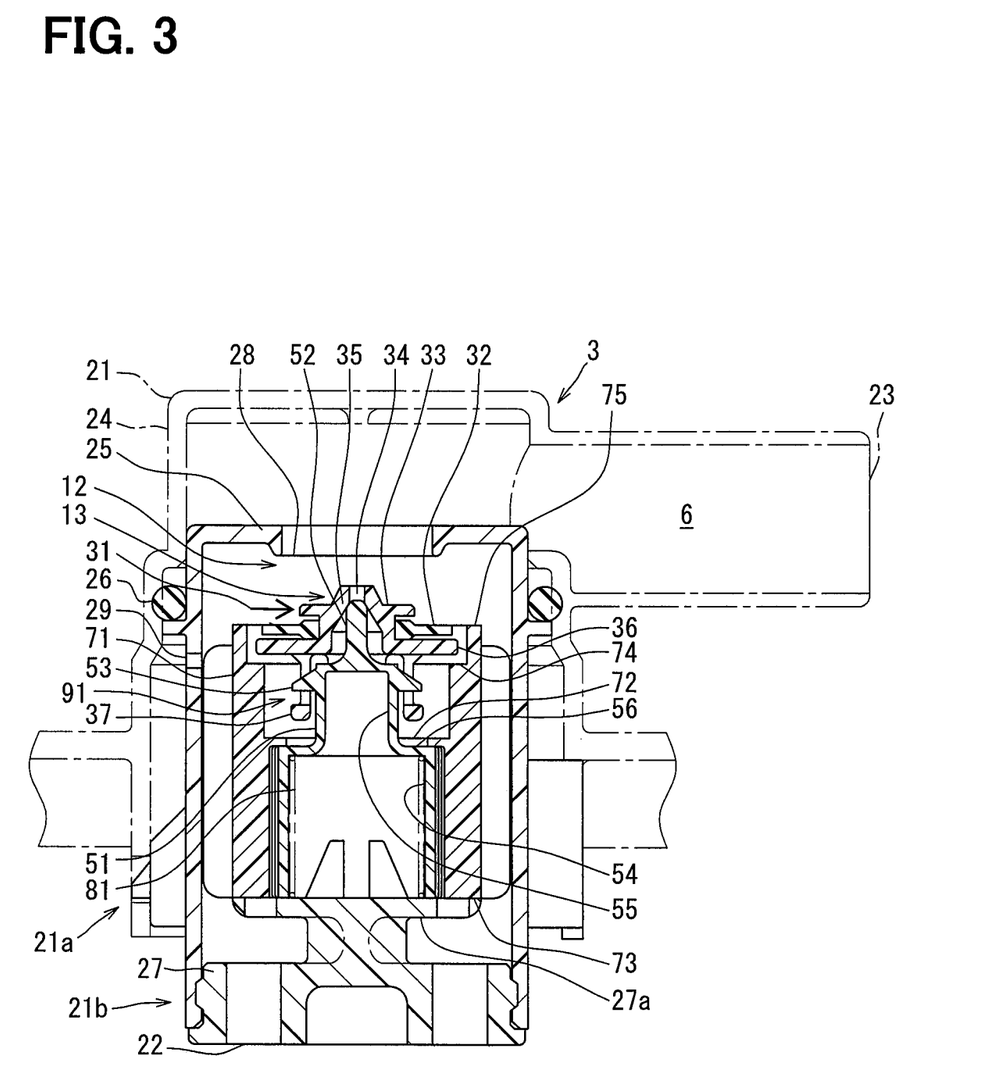
FIG. 3 is a cross-sectional view illustrating a fuel shutoff valve.
Figure 4:
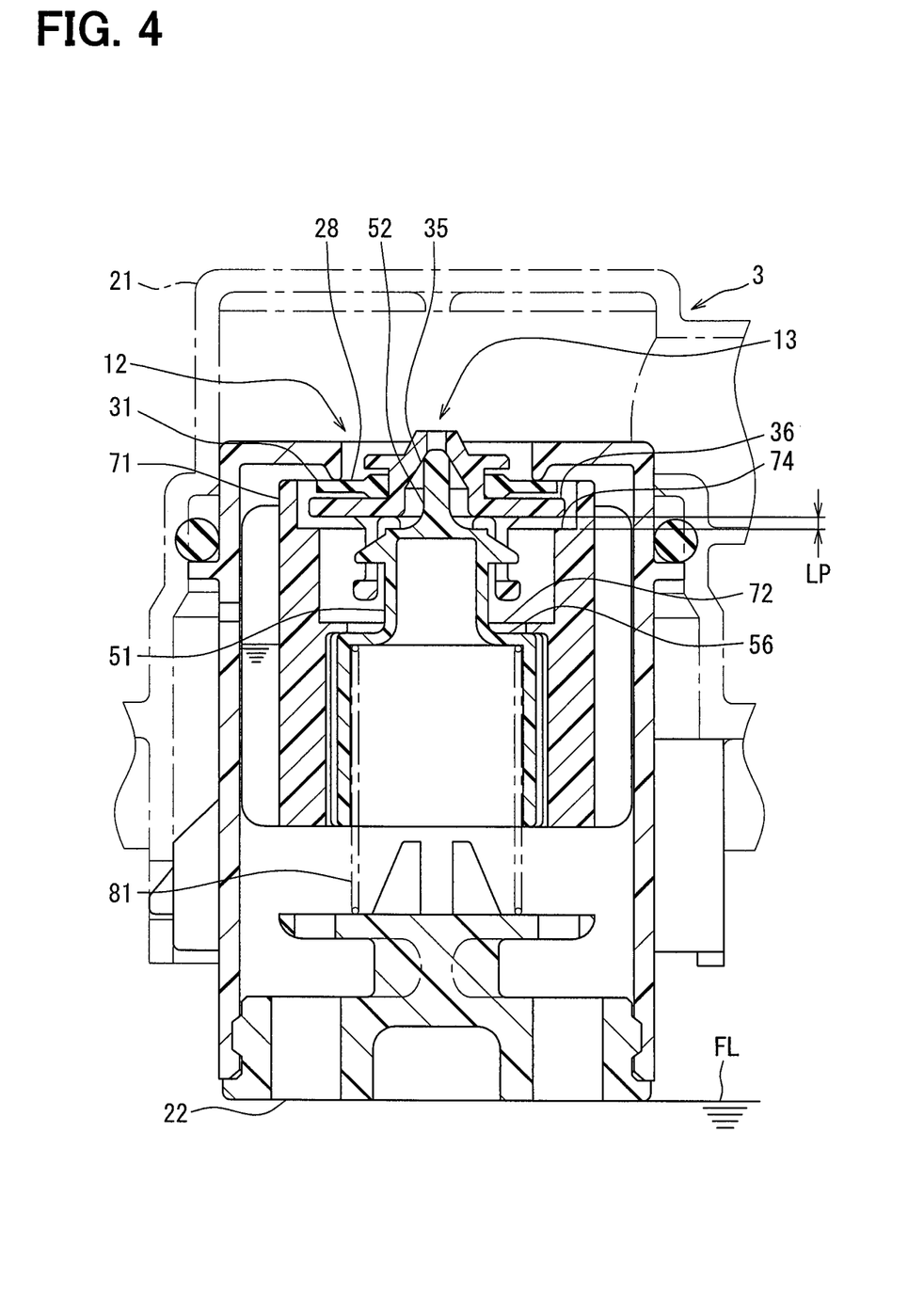
FIG. 4 is a cross-sectional view illustrating a closed state of the fuel shutoff valve as a liquid level sensing valve.
Figure 5:
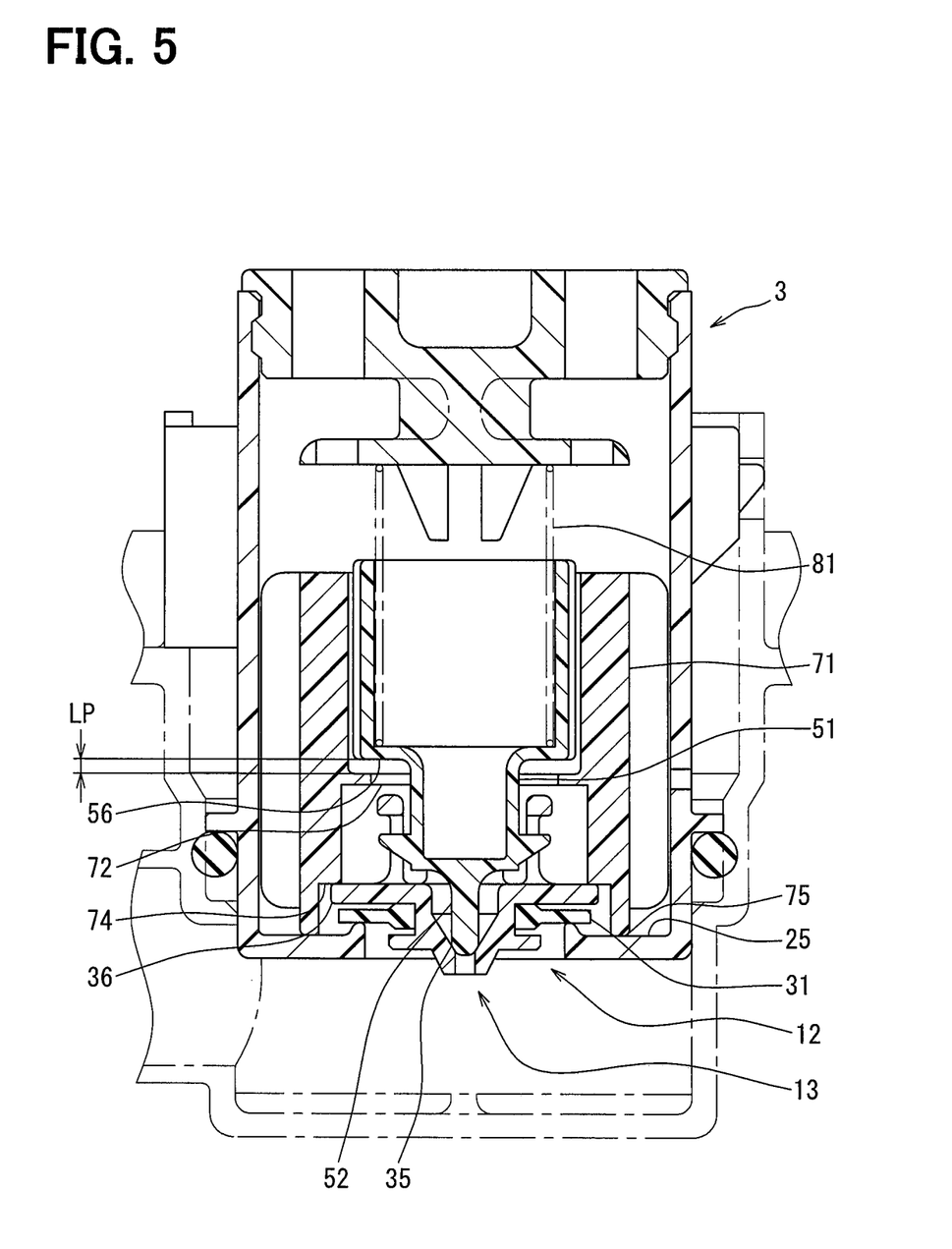
FIG. 5 is a cross-sectional view illustrating a closed state of the fuel shutoff valve as a tilt sensing valve.

In FIG. 2, the control valve 3 is represented as a simplified model of FIGS. 3-5. The control valve 3 includes a valve 11 for opening and closing the air passage. The valve 11 has a main valve 12 and a pilot valve 13. The main valve 12 opens or closes the air passage. When the main valve 12 is open, the air passage is opened. When the air passage is opened, the cavity in the fuel tank 2 communicates with the fuel vapor treatment device 4. When the main valve 12 is closed, the air passage is closed. When the air passage is closed, the communication between the cavity in the fuel tank 2 and the fuel vapor treatment device 4 is shut off.

The pilot valve 13 opens or closes a pilot passage separately from the main valve 12. The pilot passage is a passage for communication between an upstream and a downstream of the main valve 12. When the pilot valve 13 opens, the pilot passage opens. When the pilot valve 13 is closed, the pilot passage is closed. The pilot valve 13 opens and closes the pilot passage having a passage sectional area smaller than that of the air passage which is opened or closed by the main valve 12. The pilot valve 13 has a structure that is less affected by the pressure difference than the main valve 12. The pilot valve 13 can be opened and closed independently of the main valve 12. The pilot valve 13 is opened and closed when the main valve 12 is closed. The pilot valve 13 is opened earlier than the main valve 12 when the main valve 12 is closed and there is a pressure difference between the upstream and the downstream of the main valve 12.

When the valve 11 closes, both the main valve 12 and the pilot valve 13 are closed. While the valve 11 is closed, the main valve 12 and the pilot valve 13 are closed. When the valve 11 opens, only the main valve 12 opens, or the pilot valve 13 opens ahead of the main valve 12. When the main valve 12 is closed and there is a pressure difference between the upstream and the downstream of the main valve 12, the pilot valve 13 opens earlier to reduce the pressure difference. Subsequently, the main valve 12 opens. When the valve 11 opens, the pilot valve 13 is used to make the main valve 12 easy to open. The pilot valve 13 is also used as a force transmission path for closing the main valve 12.

The control valve 3 has a housing 21, a main valve body 31, a float 51, an auxiliary member 71, and a spring 81, each of which is made of a suitable material such as resin, metal, or rubber. The housing 21 supports the main valve body 31, the float 51, the auxiliary member 71, and the spring 81. The housing 21 houses the main valve body 31, the float 51, the auxiliary member 71, and the spring 81 in the housing 21. The housing 21 is a cylindrical member. The housing 21 has an opening 22 at one end as an inlet communicating with the fuel tank 2 and an opening 23 at the other end as an outlet communicating with the fuel vapor treatment device 4. The housing 21 defines the air passage. The housing 21 defines a fixed valve seat for the valve 11 to open and close the air passage.

The housing 21 is a guide member that guides the main valve body 31, the float 51, and the auxiliary member 71 so as to be movable in the axial direction (up-down direction in the drawing). Each of the main valve body 31, the float 51, and the auxiliary member 71 is also a guide member for guiding the others.

The main valve body 31 is a movable valve body of the main valve 12. The main valve body 31 is an umbrella type valve. The main valve body 31 is movable with respect to the housing 21. The main valve body 31 is indirectly supported with respect to the housing 21. The main valve body 31 is supported by the housing 21 through the float 51 and the auxiliary member 71. The main valve body 31 defines a fixed valve seat for the pilot valve 13.

The float 51 is cylindrical, and is arranged coaxially with the main valve body 31. The float 51 is a member floating on the liquid surface of the fuel. The float 51 is also a first float body that is movable. The float 51 is movably supported with respect to the housing 21. The float 51 is a container that is able to float when the control valve 3 is in a normal position, that is, in the illustrated state. The float 51 cannot float on the liquid surface when the control valve 3 tilts by more than a first predetermined angle from the normal position. For example, in the upside-down posture shown in FIG. 5 to be described later, the float 51 is a weight that allows fuel to be taken in. The float 51 is a cylindrical and cap-shaped container in which the upper part is closed and the lower part is open.

The float 51 floats on the fuel and moves in the valve closing direction. As a result, the float 51 closes the valve 11. The float 51 moves in the valve opening direction opposite to the valve closing direction to open the valve. In the illustrated normal position, the upward direction is the valve closing direction and the downward direction is the valve opening direction. The float 51 drives the main valve body 31 in the valve opening position or the valve closing position. The float 51 drives the main valve body 31 in the valve opening position when the liquid level is lower than a predetermined height. The float 51 drives the main valve body 31 in the valve closing position when the liquid level exceeds a predetermined height. The float 51 provides a movable valve body of the pilot valve 13. A connecting mechanism is provided between the main valve body 31 and the float 51 for operating the main valve body 31 in accordance with the floating state of the float 51. The connecting mechanism opens or closes the pilot valve 13, and transmits a force for moving the main valve body 31 itself to a valve opening position or a valve closing position.

The auxiliary member 71 is cylindrical, and is arranged coaxially with the float 51. The auxiliary member 71 is disposed outside the float 51. The auxiliary member 71 has a predetermined weight. The auxiliary member 71 is a member that functions as a weight. The auxiliary member 71 is a second float body that is movable. The auxiliary member 71 is a member separate from the main valve body 31 and the float 51. The auxiliary member 71 is movably supported with respect to the housing 21. The auxiliary member 71 is movably supported with respect to the float 51. The auxiliary member 71 is supported between the main valve body 31 and the float 51. The auxiliary member 71 is movably supported between the main valve body 31 and the float 51.

The auxiliary member 71 is configured to apply the weight of the auxiliary member 71 on the main valve body 31 or the float 51. An abutment mechanism is formed between the float 51 and the auxiliary member 71, for switching the weight of the auxiliary member 71 to act or not on the float 51 according to the orientation of the control valve 3. An abutment mechanism is formed between the main valve body 31 and the auxiliary member 71, for switching the weight of the auxiliary member 71 to act or not on the main valve body 31 according to the orientation of the control valve 3.

The auxiliary member 71 can abut on the float 51 to apply the weight on the float 51 in the valve opening direction. The auxiliary member 71 applies the weight to the float 51 in the valve opening direction over the entire range of the floating area of the float 51 when the control valve 3 is in the normal position. There is a case where the auxiliary member 71 does not apply the weight on the float 51 in the valve opening direction, at an end portion of the floating area of the float 51, when the control valve 3 is in the normal position.

The auxiliary member 71 can be separated from the float 51 in the valve closing direction so as not to apply the weight to the float 51. The auxiliary member 71 can be separated from the float 51 when the control valve 3 is in an inclined posture inclined by a predetermined angle or more. When the control valve 3 is not tilted, for example, even when the tilt angle is 0°, the auxiliary member 71 can be separated from the float 51 by vibrations. Thus, it is possible to adjust the force acting from the float 51 to the valve 11 (that is, the main valve body 31). Moreover, it is possible to cause the weight to act in the valve opening direction and not to apply the weight in the valve closing direction.

The auxiliary member 71 can separate from the float 51 and can abut on the valve 11 so as to apply the weight to the valve 11 in the valve closing direction. The auxiliary member 71 is provided between the valve 11 and the float 51. As a result, the weight of the auxiliary member 71 can be directly applied to the valve 11 (that is, the main valve body 31). Therefore, it is possible to effectively utilize the weight of the auxiliary member 71.

The spring 81 is an urging member that urges the main valve body 31 indirectly in the valve closing direction. The spring 81 is also a bias member that applies a force to the main valve body 31 in advance. The spring 81 causes the control valve 3 to function as a liquid level sensing valve in a normal position and to function as a tilt sensing valve when tilted by a first predetermined angle or more from the normal position. The spring 81 causes the control valve 3 to function as a tilt sensing valve even when the control valve 3 lies in the lateral direction, in other words, when the control valve 3 is longer in the lateral direction than in the up-down direction. The spring 81 is arranged in a compressed state between the housing 21 and the float 51. Therefore, the spring 81 urges the float 51 from the lower side to the upper side.

When the control valve 3 is in the normal posture, the auxiliary member 71 causes the weight of the auxiliary member 71 to act on the float 51. The auxiliary member 71 is configured to apply the weight of the auxiliary member 71 on the main valve body 31 to open the main valve 12. The auxiliary member 71 is configured to apply the weight of the auxiliary member 71 on the main valve body 31 to open the pilot valve 13. The auxiliary member 71 is a weight for adjusting the height of the float 51 which floats on the fuel. The auxiliary member 71 is a weight for moving the float 51 downward when the float 51 is in air. The auxiliary member 71 is a weight for making it easy to switch the pilot valve 13 from the closed state to the open state. The auxiliary member 71 is a weight for making it easy to switch the main valve 12 from the closed state to the open state. Therefore, the auxiliary member 71 is a weight for making it easy to switch the valve 11 from the closed state to the open state.

The inclined posture of the control valve 3 inclined by a predetermined angle or more includes the upside-down posture in which the control valve 3 is turned upside down. When the control valve 3 is in the upside-down position, the auxiliary member 71 applies the weight of the auxiliary member 71 to the main valve body 31. The auxiliary member 71 is configured to directly apply the weight of the auxiliary member 71 on the main valve body 31 in the direction closing the main valve 12. The weight of the auxiliary member 71 acts in the direction of closing the main valve 12. Meanwhile, the weight of the auxiliary member 71 does not act on the float 51. At this time, the weight of the float 51 acts on the pilot valve 13. The force of the spring 81 also acts on the pilot valve 13.

Until the control valve 3 is inclined from the normal position to tilt by a second predetermined angle, the auxiliary member 71 applies its own weight to the float 51. When the control valve 3 is tilted by more than the second predetermined angle from the normal position, the auxiliary member 71 applies its own weight to the main valve body 31.

FIG. 3 illustrates a cross-sectional view of the control valve 3 in a normal position. The housing 21 has a flange 24 and a case 25. The flange 24 is a member that covers an opening of the fuel tank 2. A seal member 26 such as an O-ring is provided between the flange 24 and the case 25. The case 25 has a tubular shape or a hollow cylindrical shape. A cap 27 having an opening 22 is provided at the lower end of the case 25. The cap 27 has a seat portion 27a inside the case 25. The seat portion 27a provides a seating surface that defines the base position of the float 51 and the auxiliary member 71. The seat portion 27a is also a seating surface on which the spring 81 is seated. The case 25 is connected to the flange 24 by a connecting mechanism 21a. The cap 27 is connected to the case 25 by a connecting mechanism 21b. The connecting mechanism 21a, 21b, 21c can be provided by various structures such as snap fit, bolt, welding and the like.

The case 25 defines a fixed main valve seat 28 for the main valve 12. The main valve seat 28 is provided in the air passage. The case 25 is also a tube for forming an air chamber in the fuel tank 2. In the process of filling fuel into the fuel tank 2, when the liquid level FL of the fuel reaches the opening 22 at the lower end, the liquid level FL of the fuel is raised in the case 25, and the air chamber is left around. The case 25 has a communication hole 29 for gradually lowering the liquid level FL after the case 25 is filled with fuel. The communication hole 29 communicates the inside and the outside of the case 25.

The main valve body 31 has a seal plate 32 and a frame 33. The main valve body 31 cooperates with the main valve seat 28 to open and close the air passage. The seal plate 32 is a seal member that provides the main valve 12. The seal plate 32 is annular, and its inner periphery is joined to the frame 33. The seal plate 32 closes the main passage by being seated on the main valve seat 28. The seal plate 32 is made of soft resin or rubber. The main valve seat 28 is made of a hard resin material. The seal plate 32 of the main valve body 31 is made of a material softer than the main valve seat 28. As a result, a reliable sealing property can be obtained between the main valve seat 28 and the seal plate 32 due to the deformation of the seal plate 32.

The frame 33 is a support member for supporting the seal plate 32. The frame 33 forms the pilot passage 34 and the pilot valve seat 35 as the pilot valve 13. The pilot passage 34 is provided in the main valve body 31, and passes through the center of the main valve body 31. The pilot passage 34 is a part of the air passage. The pilot passage 34 is smaller than the air passage. The pilot passage 34 is smaller than a passage opened and closed by the seal plate 32. The pilot valve seat 35 is formed in the pilot passage 34. The pilot valve seat 35 is provided by a conical concave surface facing downward of the frame 33. The frame 33 receives the tip end of the pilot valve body 52 extending from the float 51 in the pilot passage 34.

The pilot valve body 52 is also called a valve stem. The pilot valve body 52 is a movable valve body of the pilot valve 13. The pilot valve body 52 is provided between the main valve body 31 and the float 51. The pilot valve body 52 is a member that transmits the movement of the float 51 to the main valve body 31. The pilot valve body 52 cooperates with the pilot valve seat 35 to open and close the pilot passage 34. The pilot valve body 52 has a valve body surface (seat surface), which is partially spherical, and can be seated on the pilot valve seat 35. The pilot valve seat 35 and the pilot valve body 52 are made of a hard resin material, which is less deformed. As a result, the pilot valve 13 is easy to open without the deformation. If the float 51 is too heavy, the friction between the pilot valve seat 35 and the pilot valve body 52 becomes large, and the wear amount increases in one or both of the pilot valve seat 35 and the pilot valve body 52. In this case, there is a possibility that the pilot valve body 52 has a breakage such as bending.

The frame 33 has a stopper portion 36 that can abut on the auxiliary member 71. The stopper portion 36 is a portion of the frame 33 extending outward in the radial direction. The frame 33 can be brought into contact with the auxiliary member 71 by the stopper portion 36.

A movable connector 91 is provided between the frame 33 of the main valve body 31 and the float 51. The movable connector 91 connects the main valve body 31 and the float 51 to each other so as to enable opening and closing of the pilot valve 13. In this connected state, the frame 33 and the float 51 are connected so as to be relatively movable by a predetermined distance. The predetermined distance is a distance at which the pilot valve 13 can be opened and closed. The distance between the pilot valve seat 35 and the pilot valve body 52 changes between 0 (zero) where the pilot valve seat 35 and the pilot valve body 52 come in contact with each other and the predetermined distance. As a result, the pilot valve 13 is opened and closed.

The movable connector 91 has a first engaging portion 37 in the form of a hook extending from the frame 33 toward the float 51. The movable connector 91 has a second engaging portion 53 like a nail extending from the float 51. The second engaging portion 53 is disposed inside the first engaging portion 37. The second engaging portion 53 can move within a predetermined distance defined by the first engaging portion 37. The first engaging portion 37 and the second engaging portion 53 may be provided in reverse.

The float 51 is in the form of a container opened at the lower side. The pilot valve body 52 extends to the top of the float 51. The float 51 has a stepped shape having a large diameter portion 54 at the bottom and a small diameter portion 55 at the top. Both the inner diameter and the outer diameter of the small diameter portion 55 are smaller than those of the large diameter portion 54. The large diameter portion 54 is a cylindrical portion housed inside the auxiliary member 71. The outer peripheral surface of the large diameter portion 54 has an uneven surface for forming a gap relative to the auxiliary member 71. The small diameter portion 55 extends upward from the large diameter portion 54. The small diameter portion 55 extends to the frame 33, inside the auxiliary member 71. The nail portion as the second engaging portion 53 is formed on the outer surface of the small diameter portion 55. A shoulder portion 56 facing upward is formed between the large diameter portion 54 and the small diameter portion 55. The shoulder portion 56 is a portion that provides abutment with the auxiliary member 71. In the normal position, the float 51 receives the auxiliary member 71 on the shoulder portion 56.

The auxiliary member 71 is disposed on the outer side of the float 51 in the radial direction. The auxiliary member 71 is guided to be movable in the up-down (vertical) direction by the case 25. The outer peripheral surface of the auxiliary member 71 has an uneven surface for forming a gap relative to the case 25.

The auxiliary member 71 has a first abutting portion 72 for abutting on the float 51. The first abutting portion 72 is formed to face downward in the illustrated normal posture. The first abutting portion 72 can abut on the shoulder portion 56. The first abutting portion 72 can also be separated from the shoulder portion 56.

The auxiliary member 71 has a seat surface 73 at its lower end. The auxiliary member 71 can be seated so that the seat surface 73 and the seat portion 27a come into contact with each other. In the illustrated normal posture, the base position of the auxiliary member 71 is defined by the contact between the seat surface 73 and the seat portion 27a.

The auxiliary member 71 has a second abutting portion 74 for abutting on the main valve body 31. The second abutting portion 74 can be in contact with the stopper portion 36 of the frame 33. The second abutting portion 74 is formed to face upward in the illustrated normal posture.

The auxiliary member 71 has a stopper surface 75 at its upper end. The auxiliary member 71 protrudes in the axial direction to form the stopper surface 75. The auxiliary member 71 can be seated so that the stopper surface 75 is in contact with the case 25. In the illustrated normal posture, a sufficient space is formed between the stopper surface 75 and the case 25. The stopper surface 75 is formed to be able to contact the housing 21 so as to restrict the deformation of the main valve body 31, that is, the deformation of the seal plate 32. As a result, even when the seal plate 32 is made of a deformable soft material, the amount of deformation can be limited.

The spring 81 has an elastic force to be in an illustrated compressed state by the weight of the main valve body 31, the float 51, and the auxiliary member 71. Meanwhile, when the control valve 3 tilts by more than a predetermined angle, for example, when the control valve 3 tilts by 90 degrees from the illustration, the spring 81 has an elastic force capable of closing the main valve 12 and the pilot valve 13 by pushing the main valve body 31, the float 51, and the auxiliary member 71.

FIG. 4 illustrates a valve closed state when the control valve 3 functions as a liquid level sensing valve. When the fuel level FL reaches the opening 22, the fuel rises in the housing 21. When the fuel causes the float 51 to float, the float 51 lifts the main valve body 31 and the auxiliary member 71. The float 51 lifts the main valve body 31 by the pilot valve body 52. Therefore, the pilot valve 13 is closed. The float 51 lifts the first abutting portion 72, that is, lifts the auxiliary member 71 by the shoulder portion 56. Eventually, the seal plate 32 is seated on the main valve seat 28. In this way, the main valve 12 is closed. The gap LP is referred to as a free play or distance where the auxiliary member 71 is movable when the pilot valve 13 is closed. At this time, the gap LP is formed between the stopper portion 36 and the second abutting portion 74.

In the illustrated configuration, under a normal state, only the buoyant force of the float 51, that is, only the float 51 drives the valve 11 in the valve closing direction. Therefore, the auxiliary member 71 functions as a weight. Therefore, when the liquid level in the housing 21 decreases, the float 51 descends together with the auxiliary member 71. When the first abutting portion 72 abuts on the shoulder portion 56, the weight of the auxiliary member 71 directly acts on the float 51 from the shoulder portion 56. At this time, the weight of the auxiliary member 71 acts downward on the float 51. Therefore, at this time, the weight of the auxiliary member 71 opens the pilot valve 13, and opens the main valve 12. As a result, the valve 11 is opened. At this time, the auxiliary member 71 functions as a weight that opens the pilot valve 13 via the float 51. In this way, the pilot valve 13 is opened. The pilot valve 13 lowers the differential pressure across the main valve 12. Eventually the main valve 12 opens. At this time also, the auxiliary member 71 functions as a weight that opens the main valve 12 via the float 51. In this way, an appropriate weight can be applied by the auxiliary member 71 for making the valve 11 to function.

FIG. 5 illustrates a valve closed state when the control valve 3 functions as a tilt sensing valve. When the control valve 3 is inclined by more than a predetermined angle, as a typical example, the control valve 3 is inclined by 180 degrees in FIG. 5. When the fuel tank 2 is mounted on the vehicle, FIG. 5 represents a state in which the vehicle is overturned. In this case, the control valve 3 is closed to prevent leakage of fuel. When the fuel tank 2 is inverted, the control valve 3 may be placed in the fuel.

In this case, the main valve body 31, the float 51 and the auxiliary member 71 no longer function as a float. The control valve 3 is shifted to the valve closed state by the self-weight of the main valve body 31, the float 51 and the auxiliary member 71, and the spring 81.

At this time, the stopper surface 75 of the auxiliary member 71 is in contact with the case 25 or slightly floating from the case 25. In order to reliably bring the main valve seat 28 and the seal plate 32 into contact with each other, the seal plate 32 is elastically deformed. The contact between the stopper surface 75 and the case 25 forms an elastic deformation gap for the seal plate 32 between the main valve seat 28 and the frame 33. Moreover, the circular stopper surface 75 is seated on the case 25 on the radially outer side of the main valve 12. Therefore, the auxiliary member 71 is stably seated.

The second abutting portion 74 is formed to directly operate the main valve body 31 in the valve closing direction without through the float 51. The second abutting portion 74 is in contact with the stopper portion 36 on the radially outer side of the main valve seat 28. Therefore, in the illustrated state, the second abutting portion 74 of the auxiliary member 71 abuts on the stopper portion 36. At this time, the weight of the auxiliary member 71 directly acts on the main valve body 31 from the stopper portion 36. The weight of the auxiliary member 71 moves the main valve body 31 to the valve closing position. As a result, the weight of the auxiliary member 71 reliably exerts a function as a tilt sensing valve for preventing fuel leakage. The auxiliary member 71 sets the re-open valve pressure necessary for the tilt sensing valve.

The float 51 and the spring 81 cause the pilot valve body 52 to be seated on the pilot valve seat 35. At this time, the gap LP is formed between the shoulder portion 56 and the first abutting portion 72. At this time, the weight of the auxiliary member 71 does not act on the float 51. Therefore, at this time, the weight of the auxiliary member 71 does not act on the pilot valve body 52 and the pilot valve seat 35, that is, the pilot valve 13. The weight of the float 51, the biasing force of the spring 81, and the weight of the spring 81 act on the pilot valve 13. Therefore, the load applied to the pilot valve 13 is suppressed. Therefore, even if there is vibration, the force acting on the pilot valve 13 is suppressed from changing. For example, damage such as bending of the pilot valve body 52 is suppressed. In addition, wear between the pilot valve seat 35 and the pilot valve body 52 is suppressed.

According to the embodiment described above, when the control valve 3 is in the normal posture, a desired force, that is, a desired weight can be applied to the main valve body 31 in the valve opening direction. When the control valve 3 is tilted by more than a predetermined angle or when vertical vibration is applied, it is possible to suppress influence caused due to the weight. Further, when the control valve 3 is in the normal position, it is possible to give the pilot valve 13 an appropriate weight in the valve opening direction. When the control valve 3 tilts by more than a predetermined angle, the load acting on the pilot valve 13 can be suppressed. Moreover, when the control valve 3 is tilted by more than a predetermined angle, the weight of the auxiliary member 71 can act on the main valve body 31 in the valve closing direction. Since the mechanically interlocked state between the float 51 and the auxiliary member 71 is switched between the contact state and the separated state according to the orientation of the control valve 3, the force in the valve opening direction can be switched between a force in the positive opening direction and a force in the negative opening direction by the weight.

Other Embodiments

The disclosure in this specification is not limited to the illustrated embodiment. The disclosure encompasses the illustrated embodiments and modifications by those skilled in the art based thereon. For example, the disclosure is not limited to the parts and/or combinations of elements shown in the embodiments. The disclosure can be implemented in various combinations. The disclosure may have additional parts that may be added to the embodiment. The disclosure encompasses omissions of parts and/or elements of the embodiments. The disclosure encompasses replacement or combination of parts and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

In the above embodiment, a so-called full tank control valve is provided by the control valve. Therefore, a sub valve may be additionally provided to cause a first automatic stop of the fueling device 5. Further, a mechanism for temporarily storing fuel in the housing 21 may be provided. For example, a sub tank may be formed around the float 51.

In the above embodiment, the pilot passage 34 is formed in the frame 33, and the pilot valve 13 is disposed relative to the pilot passage 34. Alternatively, the pilot valve 13 may be disposed in the case 25. The pilot valve body 52 may be provided by another member provided between the pilot valve seat 35 and the float 51. The main valve body 31 may be directly opened and closed by the float 51 without providing the pilot valve 13. Even in this case, it is possible to apply the weight to the float 51 correspondingly to the orientation, since the weight acts only in the valve opening direction of the auxiliary member 71.

In the above embodiment, the auxiliary member 71 is in contact with the stopper portion 36. Alternatively, the stopper surface 75 of the auxiliary member 71 may be formed to be in contact with the case 25. The main valve body 31 functions as a tilt sensing valve at least due to its own weight. Also in this case, the weight of the auxiliary member 71 is applied to the float 51 until exceeding the predetermined inclination angle, and the weight of the auxiliary member 71 is not applied to the float 51 after exceeding the predetermined inclination angle. Therefore, the force acting on the float 51 in the valve opening direction can be changed between when functioning as the liquid level sensing valve and when functioning as the tilt sensing valve, and the necessary characteristics can be realized as the liquid level sensing valve.

What is claimed is:

1. A fuel shutoff valve comprising:
a valve configured to open or close an air passage of a fuel tank;
a float floating on fuel and moving in a valve closing direction to close the valve, or moving in a valve opening direction opposite to the valve closing direction to open the valve; and
an auxiliary member having a predetermined weight, the auxiliary member abutting on the float to apply a weight on the float in the valve opening direction, or separating from the float not to apply the weight on the float in the valve closing direction, wherein
the float has
an outermost diameter portion, and
an inner diameter portion smaller than the outermost diameter portion in diameter,
the auxiliary member is surrounding the outermost diameter portion of the float in a radial direction, and
the auxiliary member is provided with the valve and the float to separate from the float and abut on the valve to apply the weight on the valve in the valve closing direction.

2. The fuel shutoff valve according to claim 1, wherein the valve has
a housing defining the air passage and a main valve seat fixed on the air passage, and
a main valve body that is movable to be seated on the main valve seat, and
the auxiliary member has a stopper surface configured to abut on the housing to restrict a deformation of the main valve body.

3. The fuel shutoff valve according to claim 1, wherein
the auxiliary member has an abutting portion that abuts on the float in the valve opening direction, and
the float has a shoulder portion configured to receive the auxiliary member.

4. The fuel shutoff valve according to claim 3, wherein
the shoulder portion of the float is located between the outermost diameter portion and the inner diameter portion, and
the auxiliary member is a tubular member surrounding an outermost side of the float in the radial direction.

5. The fuel shutoff valve according to claim 1, wherein the valve is comprised of
a main valve configured to open or close the air passage, and
a pilot valve configured to open or close a pilot passage smaller than the air passage, the pilot passage communicating an upstream and a downstream of the main valve,
the main valve has a main valve seat provided on the air passage and a main valve body configured to open or close the air passage in cooperation with the main valve seat, and
the pilot valve has a pilot valve seat provided on the pilot passage and a pilot valve body configured to open or close the pilot passage in cooperation with the pilot valve seat.

6. The fuel shutoff valve according to claim 5, wherein
the pilot passage is provided in the main valve body, and
the pilot valve body is provided between the main valve body and the float and transmits a movement of the float to the main valve body.

7. The fuel shutoff valve according to claim 5, further comprising:
a movable connector disposed between the main valve body and the float to connect the main valve body and the float with each other so as to enable opening or closing of the pilot valve.

8. The fuel shutoff valve according to claim 5, wherein the pilot valve seat and the pilot valve body are made of a resin material.

9. The fuel shutoff valve according to claim 5, wherein the main valve seat is made of a resin material, and the main valve body is made of a material that is softer than the main valve seat.

10. A fuel shutoff valve comprising:
a valve configured to open or close an air passage of a fuel tank;
a float floating on fuel and moving in a valve closing direction to close the valve, or moving in a valve opening direction opposite to the valve closing direction to open the valve; and
an auxiliary member having a predetermined weight, the auxiliary member abutting on the float to apply a weight on the float in the valve opening direction, or separating from the float not to apply the weight on the float in the valve closing direction, wherein
the auxiliary member is surrounding an outermost side of the float in a radial direction,
the auxiliary member is provided with the valve and the float to separate from the float and abut on the valve to apply the weight on the valve in the valve closing direction, the valve has
- a housing defining the air passage and a main valve seat fixed on the air passage, and
- a main valve body that is movable to be seated on the main valve seat, and the auxiliary member has a stopper surface configured to abut on the housing to restrict a deformation of the main valve body.

\* \* \* \* \*